UNITED STATES PATENT OFFICE.

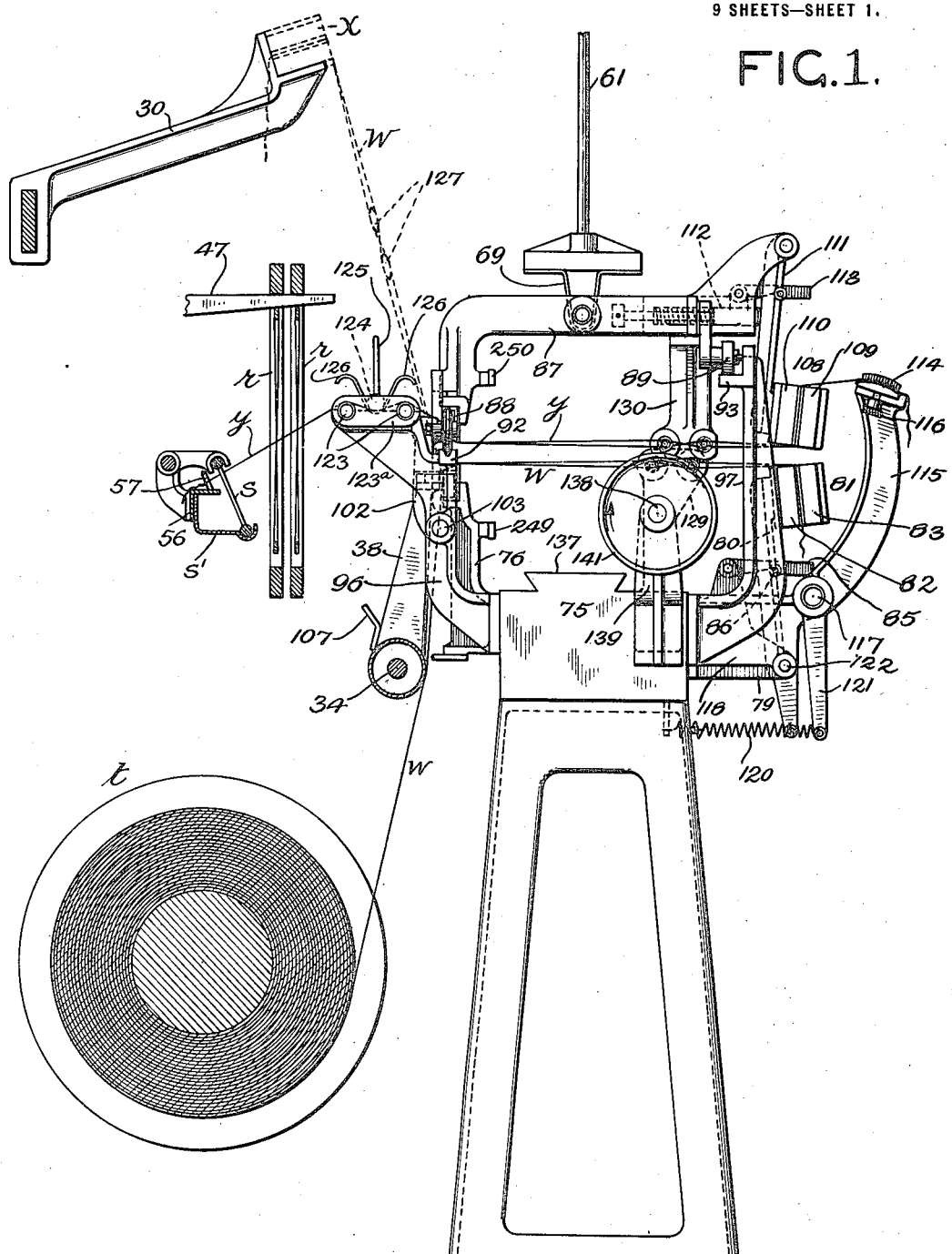

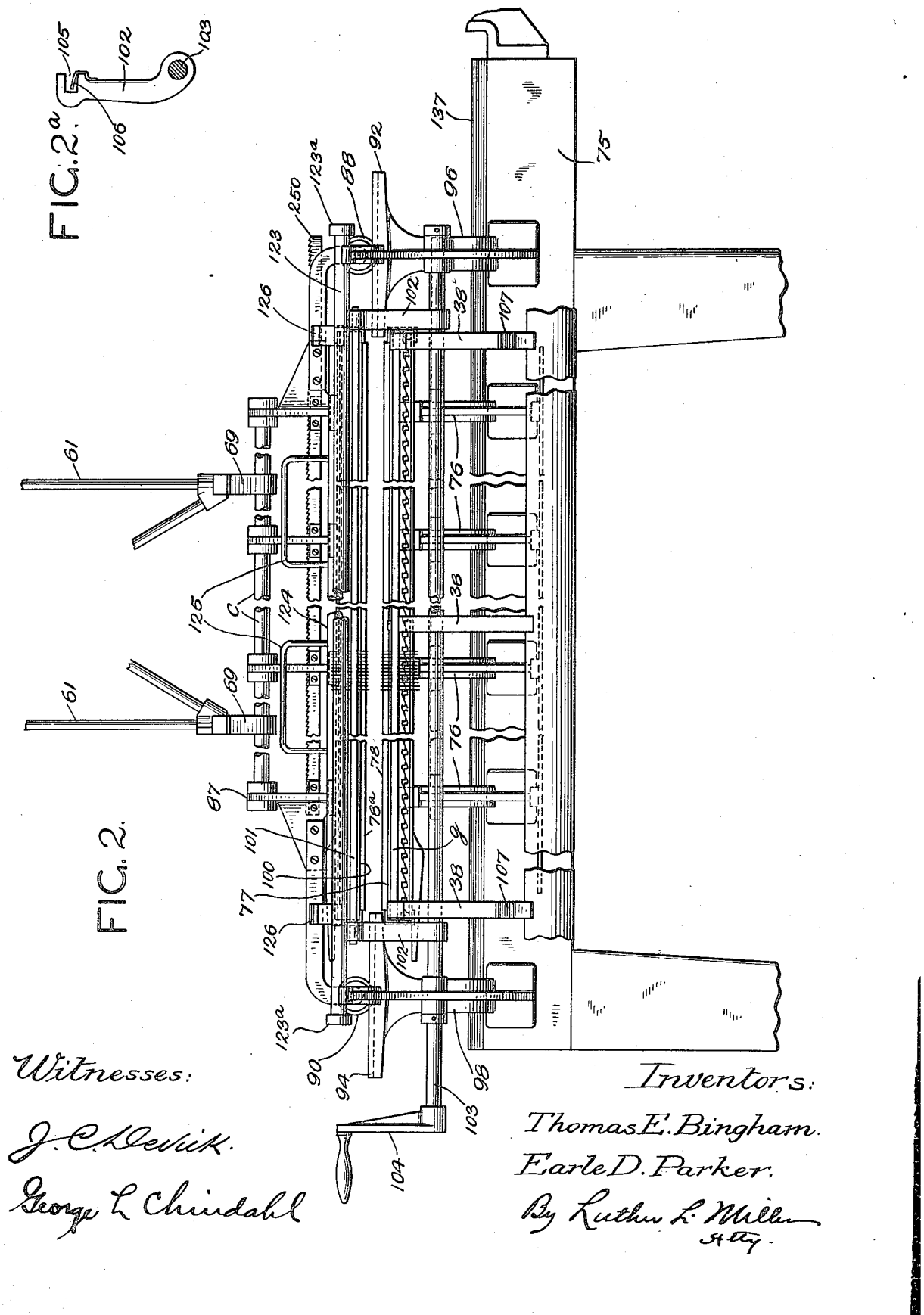

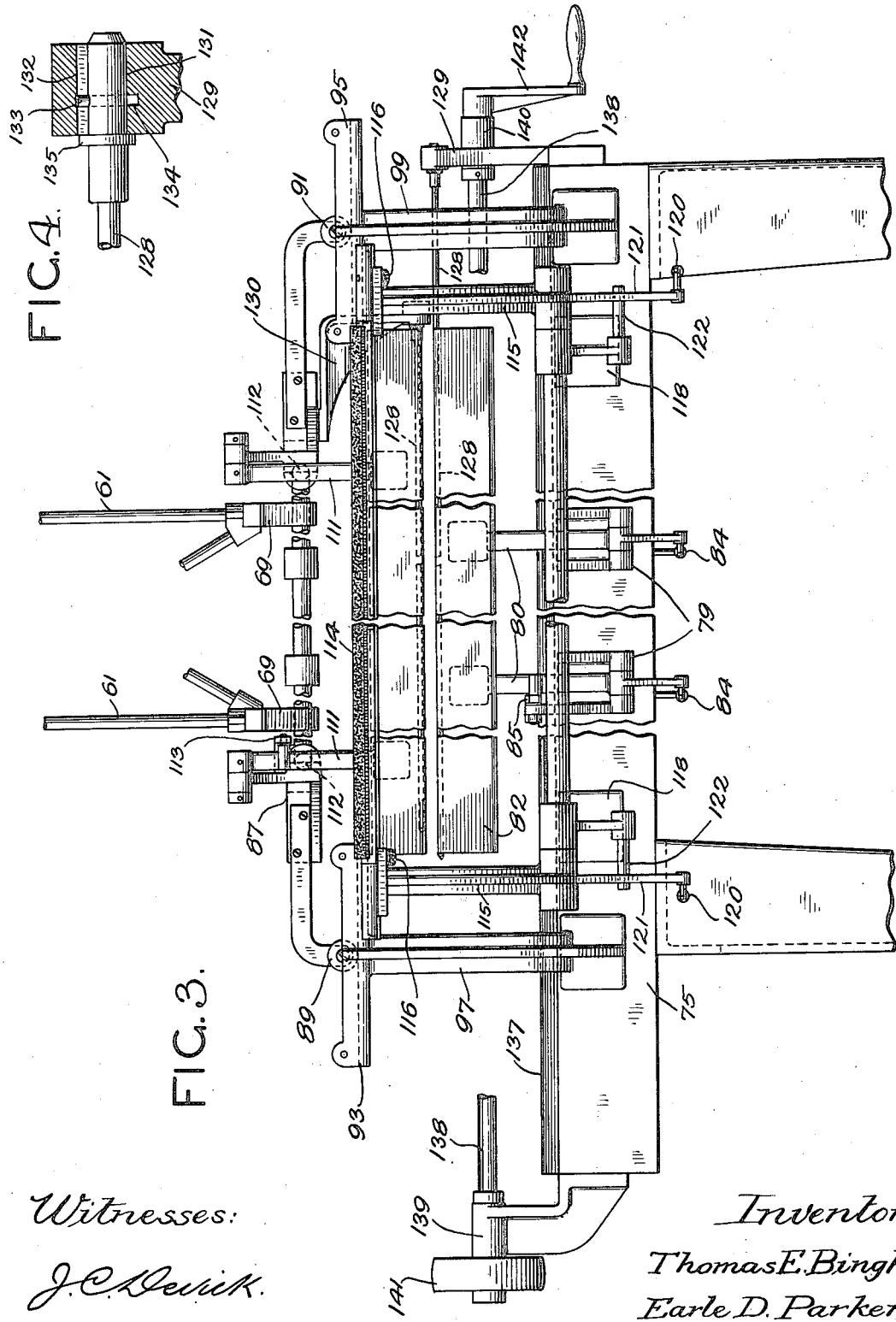

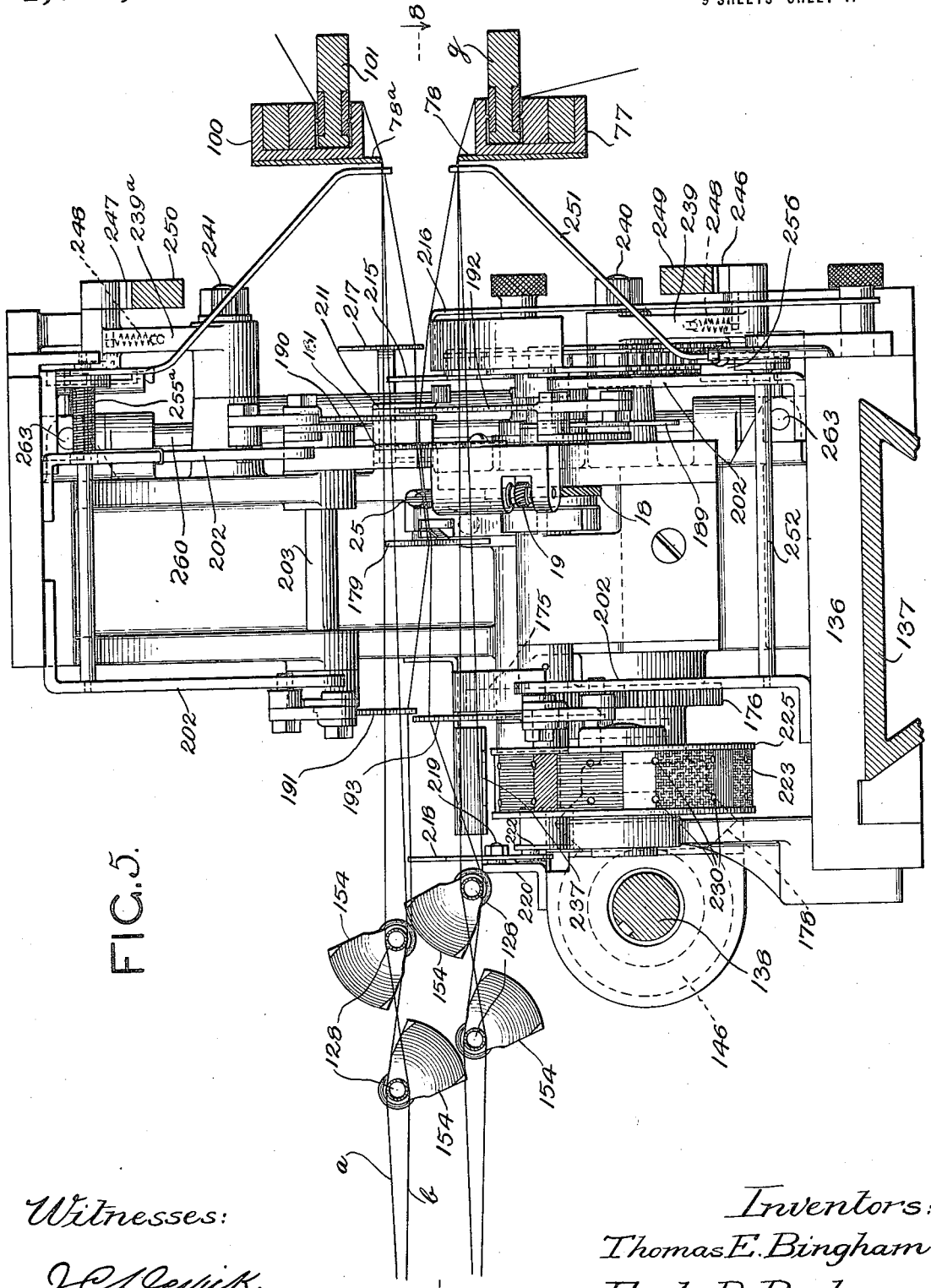

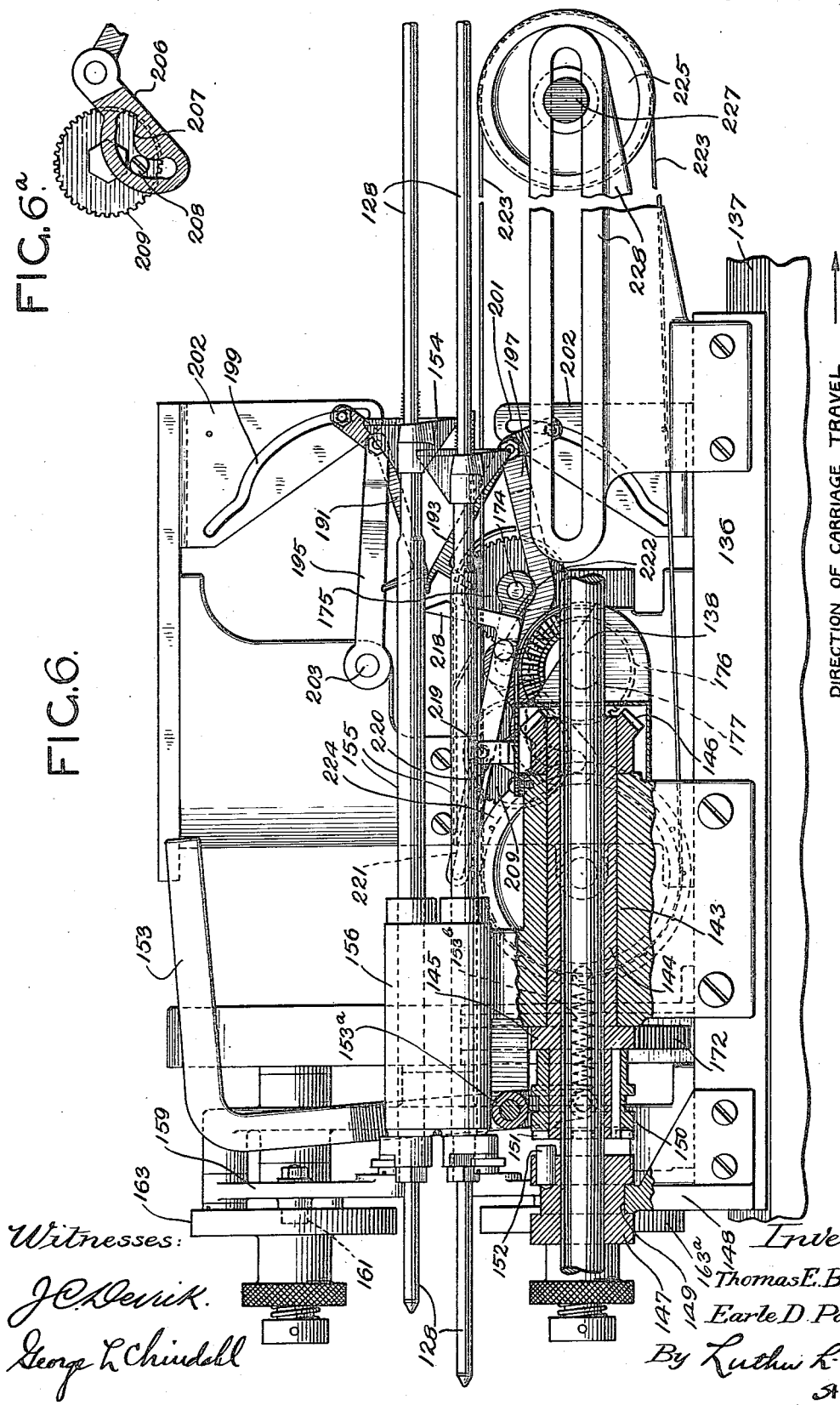

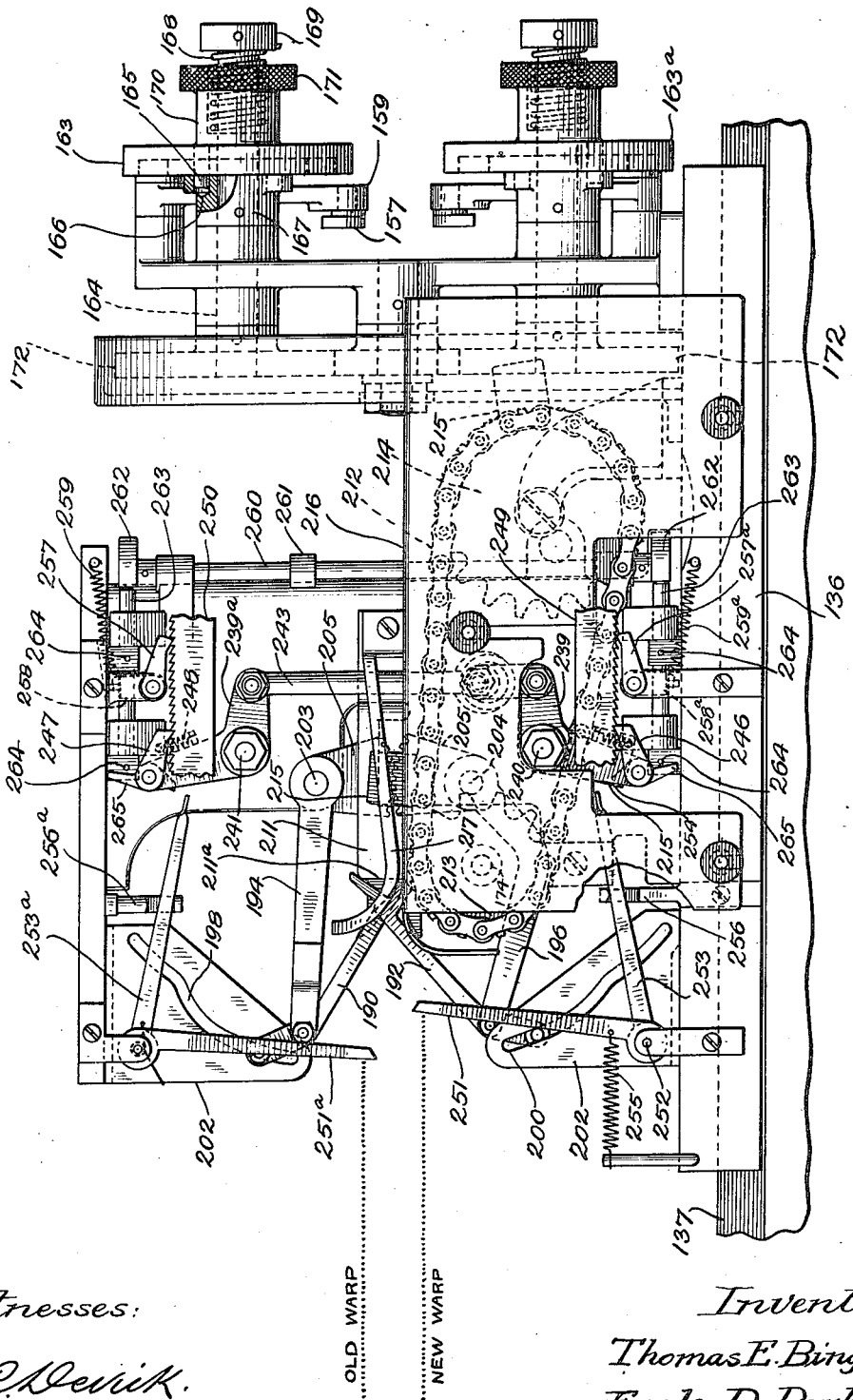

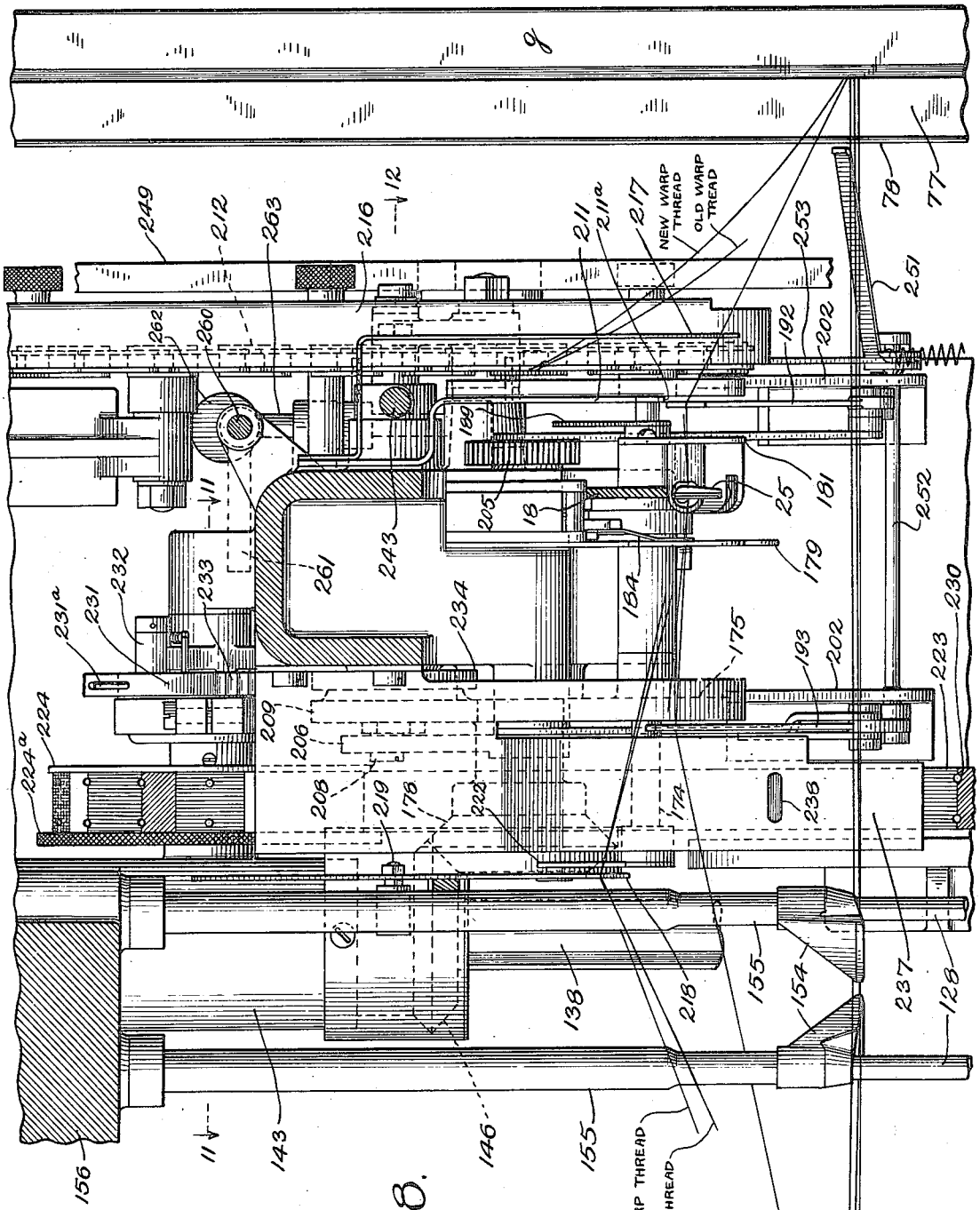

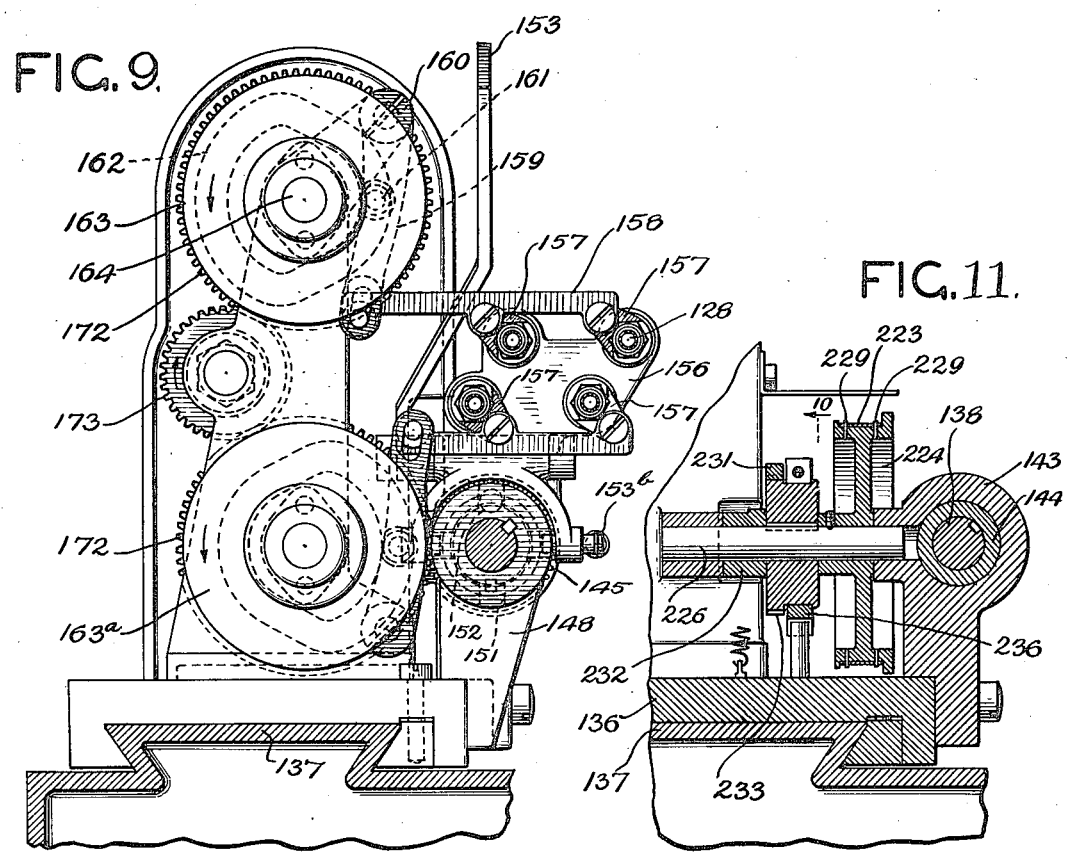
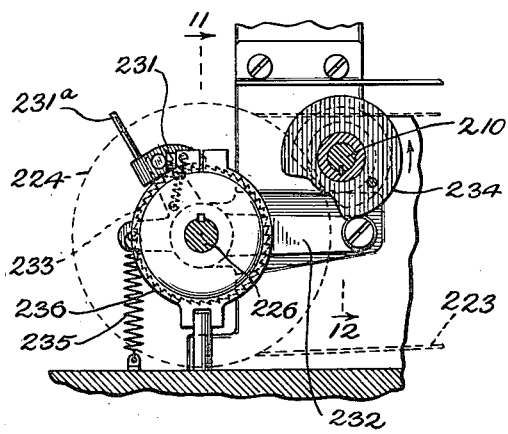
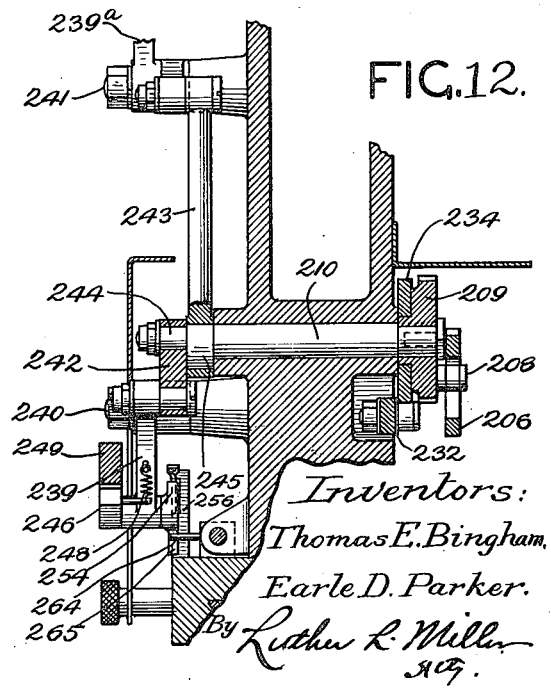

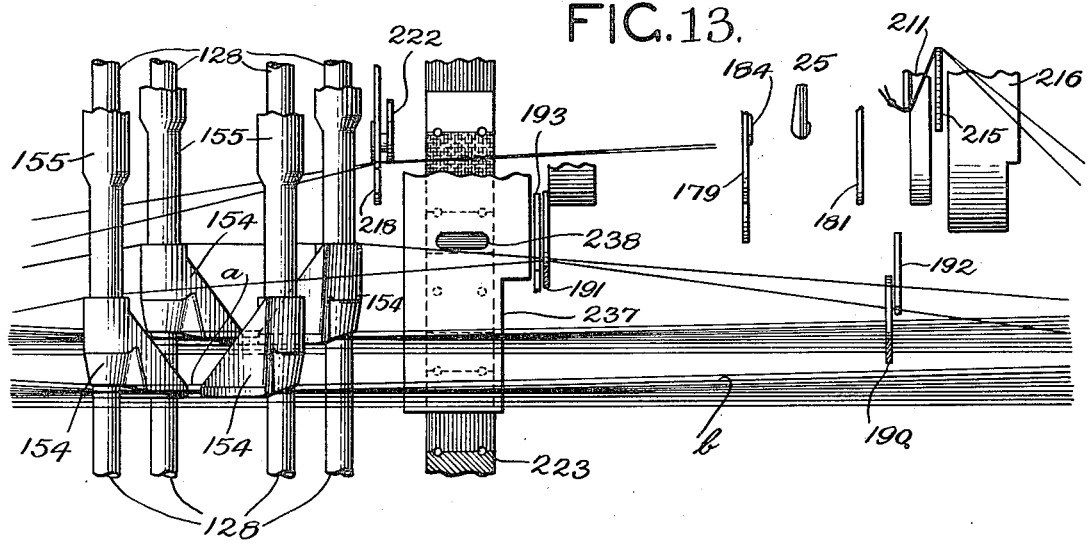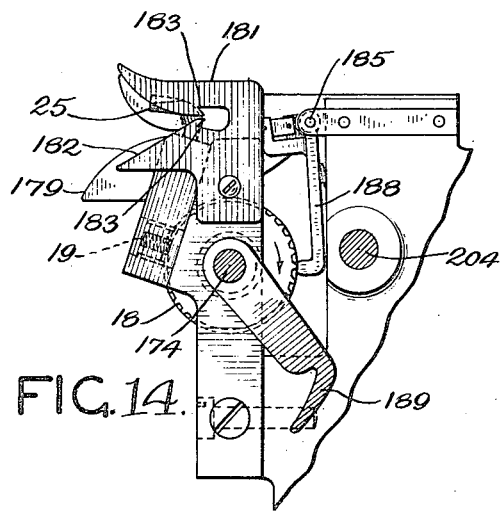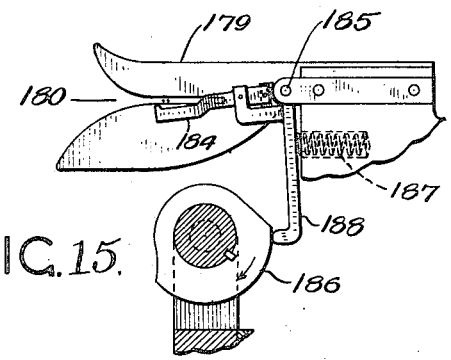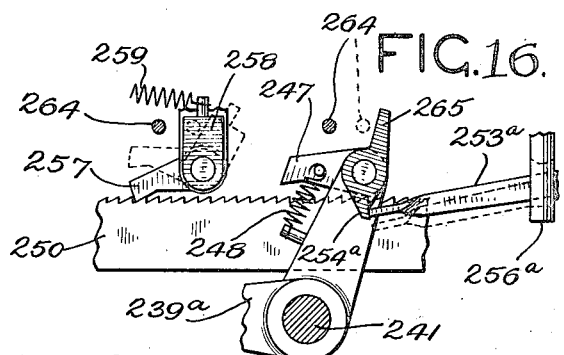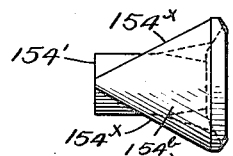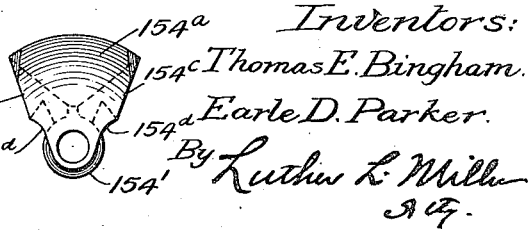

THOMAS ERNEST BINGHAM, OF MANCHESTER, ENGLAND, AND EARLE D. PARKER, OF ROCKFORD, ILLINOIS, ASSIGNORS TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

MACHINE FOR OPERATING UPON WARPS.

1,306,097.          Specification of Letters Patent.      Patented June 10, 1919.

Application filed May 10, 1915. Serial No. 26,997.

*To all whom it may concern:*

Be it known that we, THOMAS E. BINGHAM, a subject of the King of Great Britain, residing at Manchester, England, and EARLE D. PARKER, a citizen of the United States, residing at Rockford, in the county of Winnebago and State of Illinois, have invented certain new and useful Inventions in Machines for Operating upon Warps, of which the following is a specification.

This invention relates to machines for operating upon warps, as for example, warp-uniting and warp-drawing machines, the invention being herein disclosed in connection with a warp-tying machine.

One of the objects of the invention is to provide improved means for selecting threads from a leased warp.

Another object of the invention is to provide improved means for carrying selected threads to the uniting means or other means for operating upon the selected threads.

A further object is to provide a warp-tying machine which is especially adapted to operate upon striped warps.

The invention further relates to the various features of improvement hereinafter set forth.

In the accompanying drawings, Figure 1 is an end elevation of a warp-tying machine embodying the features of this invention, the selecting and uniting mechanism being omitted. This view also illustrates a portion of a truck which may be used with the warp-tying machine. Fig. 2 is a side elevation of the warp-tying machine looking from the left-hand side of Fig. 1, parts being broken away to shorten the view, the selecting and uniting mechanism being omitted. Fig. 2ª is a detail view of an arm for supporting an insertion bar. Fig. 3 is a view looking from the right-hand side of Fig. 1, the selecting and uniting mechanism being omitted and parts being broken away to shorten the view. Fig. 4 is a fragmental sectional view illustrating the manner of removably supporting certain lease rods. Fig. 5 is a fragmental transverse vertical sectional view through the warp-tying machine. Fig. 6 is a view of the traveling mechanism looking from the left-hand side of Fig. 5, with certain parts in section. Fig. 6ª illustrates the means for actuating the carry-in fingers. Fig. 7 is a view of the traveling mechanism taken from the right-hand side of Fig. 5. Fig. 8 is a fragmental sectional view taken in the plane of dotted line 8—8 of Fig. 5. Fig. 9 is a view looking from the right-hand side of Fig. 7, with parts omitted. Fig. 10 is a view taken approximately in the plane of dotted line 10 of Fig. 11. Fig. 11 is a view taken in the plane of dotted line 11—11 of Figs. 8 and 10. Fig. 12 is a sectional view on dotted line 12 of Figs. 8 and 10. Fig. 13 is a fragmental view illustrating the action of the several mechanisms. Fig. 14 illustrates the knot-tying and stripping mechanisms. Fig. 15 is a view of a clamping mechanism associated with the knotter. Fig. 16 is a fragmental view of the means for feeding the warp carriage and for causing said carriage to move with the mechanism carriage. Figs. 17, 18 and 19 are detail views of one of the selectors.

Fig. 1 is an end elevation of a warp-tying machine (the traveling uniting mechanism being omitted), together with portions of a truck for presenting the old and the new warp to said machine. This truck may be of any preferred construction, as for example, that shown in Patent No. 955,383, dated April 19, 1910. Applying the same reference characters to the present drawings as are used in said patent, $t$ is the loom beam; $w$ is the end portion of the new warp wound on said beam; $x$ is a clamp in which the end of the new warp is held; 38 are arms mounted for pivotal movement on a shaft 34 which is laterally movable toward and away from the front side of the truck; $g$ (Fig. 2) is an insertion bar by means of which the new warp is inserted into one of the clamps on the warp-tying machine; 30 are arms for temporarily supporting the end of the new warp; 47 are arms for supporting the loom harnesses $r$ which are associated with the section of old warp $y$; 56 is a bar which is laterally movable toward and away from the front side of the truck, said bar carrying a series of pins 57 by means of which a small piece of fabric cut from the cloth last woven in the loom may be attached to the bar 56; and $s$ is the loom reed, the reed being held in a holder $s'$ of any suitable construction, as, for example, that shown at 146 and 147 in Patent No. 1,082,474, dated December 23, 1913. In Patent No. 955,383 above referred to, two trucks are provided, each pivoted so as to permit of swinging the trucks alternately into position alongside the warp-tying machine. Where but one truck is used, it will be understood that the truck need not be pivoted, but may move in a straight line toward and away from the warp-tying machine.

In the operation of the warp-tying machine, a portion of the new warp is supported in a horizontal plane by means of two clamps carried by the bed of the machine, a portion of the old warp being supported in a horizontal plane (above the new warp) by means of two clamps attached to a warp carriage. To facilitate the insertion of the warps in the before-mentioned clamps, means is provided for raising the warp carriage out of the way and for lowering the carriage. Said raising and lowering means may be of any suitable character, as, for example, that shown in Figs. 1 and 6 of Patent No. 962,400 dated June 21, 1910. 61 is the suspension frame, and 69 are loops that loosely embrace a rod $c$ forming part of the warp carriage. In the use of the present apparatus, it is not necessary that the suspension frame 61 be horizontally movable as in said Patent No. 962,400.

The warp-tying machine comprises the elongated bed 75 to one side of which is secured a plurality of brackets 76 for supporting a warp clamp 77. Said clamp may be of any suitable construction, as, for example, that shown in Figs. 8, 9 and 10 of Patent No. 1,082,474 dated Dec. 23, 1913. Fixed to the inner side of the clamp 77 is a plate 78 (Fig. 5) over which the new warp extends. At the opposite side of the bed 75 is means for movably supporting a warp clamp. Herein are shown two brackets 79 (Figs. 1 and 3) fixed to the bed, said brackets serving to pivotally support two arms 80. These arms carry a warp clamp 81 consisting of a bar 82 fixed to the upper ends of the arms 80, and a bar 83 removably held in contact with the bar 82 by means of ordinary spring clips (not shown) or any preferred means. The adjacent faces of the bars 82 and 83 are covered with felt or other suitable friction material. Springs 84 (Fig. 3) tend to move the clamp 81 away from the clamp 77 to place tension upon the portion of the warp that extends between said clamps. The clamp 81 may be temporarily held against the tension of said springs by means of a hook 85 on one of the brackets 79, said hook engaging a pin 86 on the adjacent arm 80.

The warp carriage 87 is provided with rollers 88, 89, 90 and 91 (Figs. 1, 2 and 3) by means of which it is supported for adjusting movement on four rails 92, 93, 94 and 95, said rails being supported by brackets 96, 97, 98 and 99 fixed to the bed 75. The rails may be made integral with their respective brackets, as shown. At one side of the warp carriage is a warp clamp 100 (Fig. 5) which is similar to the clamp 77. 78$^a$ is a bar similar to the bar 78. The insertion bar 101 for the clamp 100 is placed in and withdrawn from the clamp 100 by means of two arms 102 (Figs. 2 and 2$^a$) fixed to a rock shaft 103, said shaft having a crank handle 104. In the free end of each arm 102 is an opening 105 to receive the insertion bar 101, a leaf spring 106 within said opening serving to frictionally engage the bar to temporarily retain it in said opening. 107 (Fig. 1) are projections on two of the arms 38, for a purpose to appear hereinafter.

At the side of the warp carriage 87 opposite to the clamp 100 is a clamp 108 (Fig. 1) which is similar to the clamp 81. The clamp 108 comprises a removable bar 109, and a bar 110 which is fixed to the lower ends of two arms 111. The arms 111 are pivoted at their upper ends to the warp carriage frame. Spring plungers 112 tend to swing the arms 111 to move the clamp 108 away from the clamp 100 and thus place tension on the old warp. A hook 113 serves to hold the arms 111 against the pressure of said plungers.

To hold the old warp threads after they have been brushed out into parallelism, and until they have been secured in the clamp 108, there is provided a thread-holder consisting of a bar 114 covered with card-cloth. Said bar is arranged to be supported upon two arms 115 and to be connected to said arms by means of thumb screws 116. The arms 115 are fixed upon a rod 117 which is journaled in brackets 118 fixed to the bed 75. Springs 120 tend to hold the extensions 121 of the arms 115 against stop pins 122.

To provide a supply of thread which may be given up when the old warp threads are pushed into the clamp 100 by the insertion bar 101, the following described means is employed: The brackets 96 and 98 are notched to removably support two parallel rods 123 over which the old warp extends, said rods being secured together by end-pieces 123$^a$. A weight in the form of a rod 124 may be laid on the threads between the rods 123, said rod 124 having handles 125 and hooks 126 to engage the rods 123 and thus limit the descent of the bar 124.

The devices for selecting individual threads from the warps are designed to select threads from an end-and-end lease, alternate threads of each warp being crossed as indicated in Fig. 1. The leasing or crossing of the threads may be accomplished in any desired manner. The threads of each warp are maintained in the leased condition by means of two ordinary lease-rods 127. (The rods 127 for the old warp are not shown in the drawings.) After the warps have been secured in the clamps of the warp-tying machine, the lease-rods 127 are replaced with lease-rods 128. The rods 128 are supported at one end by brackets 129 and 130 (Fig. 3) on the bed 75 and the warp carriage, respectively. The brackets 129 and 130 have holes 131 (Fig. 4) to receive the ends of the rods 128, each hole having a channel or key-way 132 for the admission of a locking pin 133 on the rod. Within the bracket is an annular groove 134 to receive the pin 133. After the rod has been inserted in the hole 131 to the extent permitted by the stop collar 135, the rod is given a partial rotation to carry the pin 133 out of register with the key-way 132, thereby locking the rod against endwise movement. When the machine is operating, the other ends of the rods 128 are supported upon the carriage on which is mounted the selecting and uniting mechanisms. This carriage is omitted in Figs. 1, 2 and 3, but is shown at 136 in Figs. 5 and 6. It is arranged to travel upon a guide 137 on the bed 75. As shown at the right-hand side in Fig. 2, one end of the bed projects far enough beyond the warp clamps to support the selecting, uniting and carriage-feeding mechanisms while the warps are being placed in and removed from the machine.

Power is transmitted to the mechanisms on the carriage 136 by means of a shaft 138 (Fig. 3) which is supported in bearing brackets 139 and 140. 141 is a drive wheel fixed on one end of the shaft 138, a hand crank 142 being mounted upon the opposite end of the shaft.

Upon the carriage 136 is a bearing 143 (Figs. 5 and 6) in which is rotatably mounted a sleeve 144, said sleeve being slidably mounted upon the shaft 138. Fixed to the sleeve at opposite sides of the bearing 143 are a pinion 145 and a bevel gear 146. The pinion 145 actuates the thread-selecting mechanism, while the bevel gear 146 actuates the remaining mechanisms mounted on the carriage 136.

Power is transmitted from the shaft 138 to the sleeve 144 by means comprising a clutch member 147 (Fig. 6) splined to the shaft and slidable therealong, the member 147 being caused to travel with the carriage 136 by a bracket 148 fixed to the carriage and engaging in a groove 149 in the clutch member. On the sleeve 144 is splined a clutch collar 150 which is provided in one end with notches 151 to receive a pin 152 set in the clutch member 147. A hand lever 153 (Figs. 6 and 9) pivoted to the carriage at 153$^a$ has a forked lower end that engages the clutch collar 150. The spring 153$^b$ normally holds the collar 150 out of engagement with the member 147.

For each warp, there are provided two selectors 154 operating at opposite sides of the crossing point of the threads. Each selector is fixed to a tubular stem 155 which is mounted for rocking movement in a support 156 on the carriage 136 (Figs. 6 and 9). To each stem is fixed a crank arm 157 (Fig. 9). The crank arms for the old-warp selectors are pivoted to a link 158 which has a pin-and-slot connection with an arm 159 which is pivoted at 160 on the carriage. The arm 159 carries a roller stud 161 that runs in a cam groove 162 in a disk 163. The disk 163 is rotatably mounted on a shaft 164, and carries a stud 165 (Fig. 7) which is adapted to lie in either of two diametrically opposite openings 166 in a collar 167 fixed on the shaft. A compression spring 168 interposed between a collar 169 on the shaft 164 and an internal shoulder in the hub 170 of the disk 163 normally holds the stud 165 in one of the openings 166. The hub 170 has a knurled flange 171.

The selectors for the new warp are actuated by mechanism similar to that just described. 163$^a$ is the cam disk for the new warp selectors. To the shafts of the cam disks 163 and 163$^a$ are fixed gear wheels 172 which mesh with a pinion 173. The lower gear wheel 172 meshes with the pinion 145.

The construction of the selectors will perhaps be best understood from an examination of Figs. 17, 18 and 19. Each selector is in the form of a wing tapering from its outer end to its hub 154'. The side 154$^a$ of the selector which faces the warp is inclined so that the outer end of the selector projects beyond the hub and toward the warp. The rear side 154$^b$ of the selector is inclined from the broadened outer end of the selector toward the hub. The opposite sides 154$^x$ taper from the side 154$^a$ to the rear portion of the selector. The edges 154$^c$ enter the space between the thread next to be taken and the succeeding thread, and assist to separate the first mentioned thread from the remaining threads. These edges do not extend to the hub, being interrupted by depressions or concavities 154$^d$.

The traveling movement of the carriage 136 is so controlled that the selectors 154 press against and bow a plurality of the leading threads of the warps. Referring now to Figs. 5 and 13: $a$ is the next thread to be taken from the old warp and $b$ is the second thread. The thread $b$ is held back by the forwardly inclined wings of the selectors. The tension of the thread $a$, due to the bowing, causes said thread to stand in contact with the ends of the hubs of the selectors. There is thus a space between the threads $a$ and $b$. As the right-hand selector swings down and the left-hand selector swings up, they crowd the thread $b$ back somewhat farther, thus widening said space; and the edges 154$^c$ enter said spaces, the inclined surfaces 154ˣ and 154ᵇ crowding or camming the thread $a$ away from the thread $b$. As the selectors reach the end of their swinging movement, the thread $b$ is permitted to spring back against the hubs of the selectors, and on the next swinging movement of the selectors the thread $b$ is set off from the succeeding threads. Inasmuch as the selectors for the new warp operate simultaneously with those for the old warp, threads are selected in pairs for presentation to the uniting mechanism.

In the present embodiment, the uniting mechanism consists of a knotter. Any suitable form of knotter may be employed. That herein shown comprises a rotatory tying bill 25 (Figs. 8 and 14) similar to the one fully described in Patent No. 959,592, dated May 31, 1910, said bill being provided with shearing edges whereby the threads are sheared after the loops of the knot have been formed. The tying bill is continuously rotated by means of spiral gears 18 and 19, the gear 18 being fixed upon a shaft 174. On said shaft is a gear wheel 175 (Fig. 6) that meshes with a gear wheel 176 rotatably mounted on a stub shaft 177. Rigid with the gear wheel 176 is a bevel gear 178 (Fig. 5) that meshes with the bevel gear 146.

At one side of the tying bill 25 is a relatively stationary thread guide 179 (Figs. 5, 8, 14 and 15) having a flaring throatway 180 to guide the selected pair of threads into position beneath the tying bill. At the opposite side of the tying bill is another relatively stationary thread guide 181 having a flaring throatway 182 which also serves to guide the threads into place beneath the tying bill. The inner portion of the throatway 182 is enlarged so as to form two notches 183 into which the threads spring after being pushed through the narrow portion of the throatway by the carry-in fingers hereinafter described, and wherein they are retained during the operation of tying the knot. 184 is a spring finger bearing against one side of the thread guide 179 and removably secured to an arm 188 pivoted at 185, the end of said finger being hooked, and said finger swinging across the inner portion of the throatway 180 to keep the threads from springing back during the formation of the loops of the knot. The rising of the finger 184 also serves to raise the threads into position to enter the open tying bill, the threads being received in the bill after the latter has made about three-quarters of a revolution. A cam 186 moves the finger 184 in one direction, movement in the opposite direction being produced by a spring 187, said cam and spring acting upon the arm 188.

The slack necessary to the production of the knot is obtained through slippage of the threads in the clamps 81 and 108. In prior constructions, the threads have been tightly clamped at both sides of the knotter, and in order to obtain the necessary slack the threads have been sheared and the ends to be tied have been held in a suction air tube from which the threads were drawn as the formation of the knot proceeded, and into which the waste ends clipped from the knot were drawn and conveyed to a centrifugal separator. By using, at one side of the knotter, clamps permitting slippage, the necessity of using a shear, a suction tube, a centrifugal separator and a fan is obviated.

The knot is tightened and the ends stripped from the tying bill by a stripper hook 189 which is fixed upon the shaft 174. The operation of this hook will be explained hereinafter.

The threads selected from the warps by the selectors 154 are moved to the knotter by four carry-in fingers 190, 191, 192 and 193 (Figs. 5, 6 and 7), the fingers 190 and 191 acting upon the old-warp thread, and the fingers 192 and 193 operating on the new warp thread. The fingers 190 and 192 are located at one side of the knotter, while the fingers 191 and 193 are at the opposite side. Said fingers have forked ends adapted to engage the threads and push them into the throatways 180 and 182. The carry-in fingers are pivoted upon arms 194, 195, 196 and 197. Each finger has an extension provided with a stud that runs in a cam groove 198, 199, 200 and 201 in cam plates 202 fixed on the carriage 136. The arms 194 et seq. and the cam grooves 198 et seq. coact to impart the necessary movement to the carry-in fingers. The arms 194 and 195 are rigidly connected by a shaft 203, the arms 196 and 197 being similarly joined by a shaft 204 (Fig. 7). The shafts 203 and 204 are connected to rock simultaneously by gear segments 205. The shaft 204 is rocked by the mechanism shown in Fig. 6ᵃ, said mechanism comprising an arm 206 having a slot 207 into which extends a stud 208 on a gear wheel 209. The wheel 209 is fixed upon a shaft 210 and meshes with the constantly rotating gear wheel 176.

As shown in Fig. 13, the selectors 154 form a space between the selected threads and the remaining threads, which space tapers toward the clamps 77 and 100 (toward the right in Fig. 13). The carry-in fingers 191 and 193 engage the selected threads relatively near the selectors, where there is ample space between the selected and the unselected threads for the entrance of the points of said fingers. The cam grooves 198 and 200 and the arms 194 and 196 are so arranged that the carry-in fingers 190 and 192 do not engage the selected threads until after the carry-in fingers 191 and 193 have begun pushing said threads toward the knotter and thus have widened the space between the selected and the unselected threads so that the points of the fingers 190 and 192 can the more readily and certainly enter said space.

As hereinbefore stated, the knot is stripped from the tying bill by the revolving hook 189, said hook operating in a space between the guide 181 and a fixed guard plate 211. (See Fig. 8.) The front end 211ª (Fig. 7) of the plate 211 serves as an abutment against which the threads are drawn by the stripper hook as the knot is stripped. After the knot has been pulled from the tying bill, the united threads are drawn out of the way of the stripper hook 189 by means comprising an endless chain 212 running over sprocket wheels 213 and 214 and carrying three lugs 215. As the knot is stripped from the tying bill, one of the lugs 215 engages the united threads and draws them out of the space between the guide 181 and the plate 211. A shield 216 keeps the united threads from contact with the chain. 217 is a guide to keep the united threads within the range of action of the lug 215 long enough to allow said lug to do its work.

The waste ends, namely, the thread portions sheared off by the tying bill and extending to the clamps 81 and 108, are drawn out of the way by a hook 218 (Figs. 6, 8 and 13). The shank of said hook is slidably and pivotally supported upon a stud 219 which is carried by a relatively stationary bracket 220 (Fig. 5), said stud extending through an elongated opening 221 (Fig. 6) in said shank. The hook 218 is pivoted to a crank 222 fixed to the shaft 174. The hook engages the threads and pulls them back a moment after they are released by the finger 184 (Fig. 15).

When uniting striped warps, it is essential that the threads be selected in proper sequence, in order that the different colored threads shall be drawn through the proper eyes of the harnesses. As there is a possibility that threads may be crossed or improperly leased or missing in one or both of the warps, it is important that the operation of the selectors 154 be carefully watched, and that any necessary corrections be made before the selected thread or threads are placed in the knotter. To assist the operator in discovering errors, there is provided means for displaying in proximity to the selected new-warp thread a colored element corresponding in color to the color of thread which should have been selected by the new-warp selectors 154. If therefore the color of the selected new-warp thread does not correspond to the color of the aforesaid element, the operator immediately perceives the existence of a defect or error, whereupon he stops the traveling mechanism and makes the necessary correction. In practice, the operator keeps his hand on the lever 153 while the traveling mechanism is running, and removes his hand from the lever as soon as he discovers an error, the spring 153ᵇ immediately throwing out the clutch 147—150 as soon as the operator releases the lever 153. In the present embodiment, the means for indicating to the operator the order in which the various colors of the pattern should be selected comprises an endless band 223 (Fig. 6) carried by two flanged rollers 224 and 225. The roller 224 is fixed upon a shaft 226 (Fig. 11). The roller 225 is mounted upon a pivot 227 which may be secured in adjusted position upon a slotted bracket 228. On the periphery of the roller 224 are driving studs 229 (Fig. 11) that enter perforations 230 (Fig. 5) in the band 223. The roller 224 is intermittently rotated by a pawl 231 (Figs. 8 and 10) pivoted on a lever 232 and engaging a ratchet wheel 233, the latter being fixed on the shaft 226. The lever 232 is pivoted on said shaft and has a roller stud that is held in contact with a cam 234 on the shaft 210 by a spring 235. A brake band 236 prevents movement of the band through momentum. 237 is a plate overlying the color band, said plate having a sight opening 238.

The outer side of the band 223 is provided in any suitable way with transverse stripes corresponding in color to the colors of the threads of the new warp. The unit width of the stripes on the band 223 may be, say, three-sixteenths of an inch, the length of each movement of the band being the same as the unit width of the stripes; thus for two adjacent threads of the same color the band would have a stripe of that color three-eighths of an inch wide. If the next stripe in the pattern was made up of four threads, there would be a stripe three-fourths of an inch wide of the same color as the stripe in the pattern. The cam grooves 198, 199, 200 and 201 are of such form that the carry-in fingers pause momentarily when the selected new-warp thread has reached a position close to the sight opening, in order that the operator may observe whether the new-warp thread corresponds in color to the portion of the band 223 which is visible through the sight opening and whether a single thread from each warp has been selected. If only one thread has been selected, or if the new-warp thread is of the wrong color, the operator lifts his hand from the lever 153, thereby stopping the travel of the carriage 136 and the operation of the mechanisms mounted on said carriage. The operator then introduces the required correction; if necessary, he operates either pair of selectors independently of the remainder of the mechanism by grasping the knurled flange 171 of the cam disk 163 or 163ª, sliding the disk laterally until the stud 165 is out of the socket 166 (the stud 161 remaining in the cam groove 162), and rotating the cam disk through a half-revolution, the spring 168 returning the stud 165 to the opposite socket 166. Correction having been effected, the operator places his hand on the lever 153, whereupon the operation of the machine is resumed.

A color band is made up for each pattern. The band must be at least long enough to extend from the roller 224 to the roller 225 when said rollers are nearest each other, and may be as much longer as the pattern requires. The band may contain one or more of the "repeats" constituting the pattern. The ends of the band are suitably joined after the band has been placed upon the rollers 224 and 225. If desired, the band may be made of adhesive tape, the colored stripes consisting of pieces of colored celluloid or the like adhering to the coated side of the tape, and the ends of the band being overlapped. In settitng the band to accord with the warps, the operator may turn the roller 224 by means of the knurled flange 224ª (Fig. 8). When the band is to be moved backward, the pawl 231 may be held out of engagement with the ratchet wheel 233 by means of the handle 231ª.

The means for moving the carriage 136 with relation to the new warp and the old warp comprises a bell crank lever 239 (Fig. 7) supported upon a pivot 240, and a similar lever 239ª pivoted at 241, said pivots being stationarily mounted on the carriage 136. The rear arms of the levers 239 and 239ª are connected by means of members 242 and 243 (Fig. 12) with a crank pin 244 and an eccentric 245, respectively, on the constantly rotating shaft 210. Upon the bell crank levers 239 and 239ª are pivotally mounted feed dogs 246 and 247 (Fig. 7). Springs 248 tend to hold the feed dogs in engagement with ratchet feed bars 249 and 250, the feed bar 249 being fixed to the posts 76 (Fig. 1) and the feed bar 250 being rigidly mounted upon the warp carriage 87. As shown in Fig. 12, the eccentric 245 and the crank pin 244 are diametrically opposed to each other; consequently as the shaft 210 is rotated, the levers 239 and 239ª will be rocked in opposite directions to cause synchronous reciprocation of the feed dogs 246 and 247.

It will be seen that if the feed dogs 246 and 247 are permitted to engage the feed bars 249 and 250 during every reciprocation of said dogs, the warp-tying mechanism will be regularly advanced step by step with relation to both warps, and that the rate of advance with relation to one warp will be the same as the rate of advance with relation to the other warp. The threads of a warp, however, are not uniformly spaced apart and the threads of the old warp may be closer together than the threads of the new warp; consequently it is necessary that the relative feed movements between the warp-tying mechanism and the warps shall be properly related to the spacing of the threads of the warps. Means is therefore provided for sensitively controlling the action of the feed dogs 246 and 247, which means will next be described.

A feed-controlling lever 251 (Figs. 5 and 7) is fixed upon a shaft 252 which is mounted in bearings on the carriage 136. The upper end of the feed-controlling lever is bent to lie in contact with the foremost thread of the new warp at a point close to the bar 78. An arm 253 is secured upon the shaft 252 and extends into position to engage the end of a finger 254 (Fig. 12) fixed to the feed dog 246. A spring 255 tends to swing the feed-controlling lever against the foremost thread of the new warp and to raise the free end of the arm 253 out of the path of the finger 254. A bracket 256 (Fig. 7) fixed upon the carriage 136 limits the oscillatory movements of the lever 251 and the arm 253. When the foremost thread of the new warp is in position to be taken by the new warp selectors, the upper end of the feed-controlling lever 251 lies in contact with said thread, and the free end of the arm 253 lies in the path of movement of the finger 254, thereby changing the movement of the point of the feed dog 246 from a substantially straight line to a curved path and thus preventing the feed dog from engaging the feed bar 249. The warp-tying mechanism consequently will not be advanced with relation to the new warp. In the event, however, that the foremost thread of the new warp is not in position to be engaged by the new warp selectors, the spring 255 tilts the controlling lever 251 and raises the rear end of the arm 253, thereby permitting the spring 248 to hold the feed dog 246 against the feed bar 249. On the next movement of the feed dog, from left to right (Fig. 7), said dog will push a tooth of the feed bar and the carriage 136 will be advanced to bring the new-warp selectors into operative relation with the foremost thread of the new warp.

251ª is the feed-controlling lever for the old warp. Fixed with relation to said lever is an arm 253ª, the rear end of which is adapted to engage a finger 254ª (Fig. 16) fixed to the feed dog 247 for the purpose of controlling the engagement of said dog with the feed bar 250. A torsion spring 255ª (Fig. 5) tends to swing the feed-controlling lever 251ª toward the old warp and to withdraw the arm 253ª from engagement with the finger 254ª. The extreme limits of the swinging movements of the lever 251ª and the arm 253ª are determined by a bracket 256ª. When the foremost thread of the old warp is in position to be taken by the old-warp selectors, the feed dog 247 is prevented from engaging the feed bar 250. In such an event, the warp carriage 87 should remain stationary with relation to the warp-tying mechanism, and in order to insure this result in case the feed dog 246 should act, I provide means for frictionally locking the warp carriage 87 to the mechanism carriage 136. Said locking means consists of a dog 257 (Fig. 7) supported upon the mechanism carriage and having an arm 258 (Fig. 16) to which a spring 259 is attached. The spring 259 presses the dog 257 against the feed bar 250 with sufficient force to cause the warp carriage 87 to move with the mechanism carriage 136 when the latter is advanced by the dog 246 and the dog 247 does not operate. When, however, the foremost thread of the old warp is not in position to be taken by the old-warp selectors, the feed dog 247 is permitted to engage the feed bar 250 and move the warp carriage 87 with relation to the warp-tying mechanism.

It will be seen that the locking dog 257 acts as a brake tending to prevent improper forward movement of the mechanism with relation to the old warp. In order to prevent such improper movement of the mechanism with reference to the new warp, I provide a dog 257$^a$ (Fig. 7) mounted on the carriage 136 and pressed against the feed bar 249 by a spring 259$^a$ acting upon an arm 258$^a$ fixed to said dog.

After the warps have been united, the carriage 136 is manually slid to its initial position adjacent to the bearing bracket 139, the feed dogs 246 and 247 and the locking dogs 257 and 257$^a$ being first disengaged from the feed bars 249 and 250 by means to be next described. On the carriage 136 is a vertical rock shaft 260 (Figs. 7 and 8) provided intermediate its ends with a handle 261 and at its ends with eccentrics 262. In line with the eccentrics are rods 263 slidably mounted on the carriage 136. Each of these rods carries square collars or blocks provided with pins 264 which are arranged to engage the fingers 258 and 258$^a$, also fingers 265 which are rigid with the feed dogs. When the shaft 260 is turned to place the eccentrics 262 against the ends of the rods 263, the feed dogs and the locking dogs are withdrawn from the feed bars, whereupon the carriage 136 may be pushed to its initial position adjacent to the bearing bracket 139. The rock shaft 260 is then turned in the opposite direction, thus permitting the springs 248, 259 and 259$^a$ to restore the rods 263 to normal position; or this may be done after the carriage has again been advanced into operative relation to another pair of warps.

The procedure in loading the machine is as follows: Assuming that the truck is away from the machine, a loom beam is placed upon the truck, the harnesses are hung upon the arms 47, the reed is clamped in the holder $s'$, the end portion of the new warp $w$ is drawn up in front of the insertion bar $g$, and the clamp $x$ laid on the arms 30, and the arms 38 are raised and moved forward into operative position. The bars 123 and 124 being off the brackets 96, the truck is moved into position alongside the warp-tying machine, the insertion bar $g$ entering the clamp 77. The clamp 77 is then closed. The warp carriage 87 being in its elevated position, and the carriage 136 being in its initial position, the clamp $x$ is carried over to the other side of the warp-tying machine, thus laying the new warp across the bar 78 (Fig. 5) and the clamp bar 82. The clamp bar 83 is then secured upon the bar 82, and the clamp $x$ removed.

The metal lease rods 128 for the new warp are inserted into the warp and secured in the bracket 129, and the wooden lease rods are drawn out of the warp. The bars 123 are now placed upon the brackets 96, the bar 114 is placed on the arms 115, and the old warp threads are brushed out into parallelism with a hand brush (not shown), the threads extending over the bars 123, and the ends of the threads being pressed into the card cloth on the bar 114. The bar 124 is then placed on the old warp, the latter being thereby bowed down between the bars 123. Two lease rods 128 are then inserted into the old warp and the wooden lease rods removed. The warp carriage 87 is now lowered onto the rails 92, 93, 94 and 95, and the clamp bar 109 secured to the bar 110, the springs 120 yielding as the old warp threads are clamped between said bars. The bar 114 may now be stripped from the threads and laid aside. The bar 101 (Fig. 2) is then placed in the arms 102, and said arms swung up (by means of the crank 104) to insert the old warp into the clamp 100, the bar 124 rising as the warp is inserted. The clamp 100 is then closed, and the arms 102 swung down. The rods 128 are then inserted in the bracket 130. The bars 123 and 124 are now removed and laid aside. The carriage 136 is pushed forward, and the free ends of the lease rods 128 are inserted into the tubular stems 155 of the selectors 154. The carriage 136 having been advanced until the selectors are in contact with the edges of the warps, the various mechanisms on the carriage are set in operation by depressing the lever 153 (Fig. 6). The unit 1 warps are removed from the machine in the following manner: By means of the crank 104 (Fig. 2) the arms 102 are swung up into engagement with the insertion bar 101; the clamp 100 is opened; the arms 102 are swung down, the insertion bar 101 being stripped from said arms by contact with the arms 38, said bar being left lying upon the projections 107 until the operator removes it; the clamp 77 is opened; the truck is pushed away from the warp-tying machine; the tab of cloth attached to the old warp is pressed upon the pins 57; the bar 56 is released as described in Patent No. 955,383, whereby the warp threads are drawn into a sheet extending from the insertion bar *g* to the bar 56; the harnesses and the reed are worked over the knots; and the united warps, with the harnesses and the reed thereon are removed from the truck. The clamps 81 and 108 are opened and the waste thread-ends removed. The wooden lease rods may be exchanged for the rods 128 at any suitable time; if desired, the rods may be exchanged in the old warp before said warp is brushed out.

We claim as our invention:

1. A machine for operating upon warps having, in combination, a machine frame, a carriage movably mounted on said frame, a toothed bar extending along the path of movement of the carriage, a carriage-feeding element on the carriage arranged to engage said toothed bar, a drive shaft carried by the machine frame and extending parallel with the path of movement of the carriage, a clutch arranged to connect said shaft with the carriage-feeding element, and a hand lever on the carriage for operating said clutch.

2. A warp-uniting machine having, in combination, devices for supporting two warps in substantially parallel planes, means for selecting threads from the warps, uniting means, two pivoted arms at one side of the warps, two pivoted arms at the other side of the warps, a finger pivotally carried by each of said arms and arranged to engage a selected thread, means for swinging said arms, and means for modifying the movement imparted to said fingers by said arms to cause the fingers to move the threads to the uniting means.

3. A warp-uniting machine having, in combination, devices for supporting two warps in substantially parallel relation, means for selecting threads from the warps, uniting means located at one side of the selecting means, two pivoted arms at each side of the uniting means and at each side of the warps, a finger pivotally carried by each of said arms and arranged to engage a selected thread, means for swinging said arms, and means for modifying the movement imparted to said fingers by said arms to cause the fingers to move the threads to the uniting means.

4. A warp-uniting machine having, in combination, devices for supporting the adjacent ends of two warps, said warps being located one above the other; means for selecting threads from the warps; uniting means located between the selecting means and the warp-supporting devices; two fingers, one for each warp, arranged to engage selected threads and carry them to the uniting means, said fingers being located between the selecting means and the uniting means; and two fingers, one for each warp, arranged to engage selected threads and carry them to the uniting means, the last mentioned fingers being located between the uniting means and said warp-end supporting devices, the last mentioned fingers being arranged to engage the threads after the other fingers have engaged and moved the threads.

5. A machine for operating upon warps having, in combination, a machine frame, a carriage movably mounted on said frame, a toothed bar extending along the path of movement of the carriage, a carriage-feeding element on the carriage arranged to engage said toothed bar, means on the carriage for operating upon warp threads, a drive shaft carried by the machine frame and extending parallel with the path of movement of the carriage, a clutch arranged to connect said shaft with the operating means and the carriage-feeding element, and a hand lever on the carriage for operating the clutch.

6. A machine for operating upon warps having, in combination, a machine frame, a carriage movably mounted on said frame, a toothed bar extending along the path of movement of the carriage, a carriage-feeding element on the carriage arranged to engage said toothed bar, a drive shaft carried by the machine frame and extending parallel with the path of movement of the carriage, a clutch arranged to connect said shaft with the carriage-feeding element, a spring tending to throw out said clutch, and a hand lever on the carriage arranged to throw in said clutch.

7. A machine for operating upon warps having, in combination a machine frame, a carriage movably mounted on said frame, means on said carriage for operating upon warp threads, a drive shaft carried by said frame and extending parallel with the path of movement of the carriage, a clutch arranged to connect said shaft with the operating means, a spring tending to throw out said clutch, and a hand lever on the carriage arranged to throw in said clutch.

8. A machine for operating upon warps having, in combination, a machine frame, a carriage movably mounted on said frame, a toothed bar extending along the path of movement of the carriage, a carriage-feeding element on the carriage arranged to engage said toothed bar, means on the carriage for operating upon warp threads, a drive shaft carried by the machine frame and extending parallel with the path of movement of the carriage, a clutch arranged to connect said shaft with the operating means and the carriage-feeding element, a spring tending to throw out said clutch, and a hand lever on the carriage arranged to throw in said clutch.

9. A machine for operating upon warps having, in combination, a machine frame, a carriage movably mounted on said frame, a toothed bar extending along the path of movement of the carriage, a carriage-feeding element on the carriage arranged to engage said toothed bar, means on the carriage for operating upon warp threads, a drive shaft carried by the machine frame and extending parallel with the path of movement of the carriage, and hand-operable means for connecting said shaft with the operating means and the carriage-feeding element.

10. A warp-uniting machine having, in combination, means for supporting a new warp and an old warp in substantially parallel position, selectors for selecting threads from the warps, a knotter, two new-warp fingers located at opposite sides of the knotter, two old-warp fingers located at opposite sides of the knotter, and means for actuating said fingers to move selected threads to the knotter.

11. A warp-uniting machine having, in combination, means for supporting a new warp and an old-warp in substantially parallel position, selectors for selecting threads from the warps, a knotter comprising a tying bill located approximately in the planes of the warps, two new-warp fingers located at opposite sides of the knotter, two old-warp fingers located at opposite sides of the knotter, and means for actuating said fingers to move selected threads to the tying bill.

12. A machine for operating upon warps having, in combination, a bed, two warp clamps on the bed, a carriage guided for movement longitudinally of the bed between the clamps, a warp carriage supported above the bed and comprising two warp clamps, thread-selecting devices on the first carriage, lease rods supported at one end by the bed, and other lease rods supported at one end by the warp carriage, the first carriage being arranged slidably to support all of said lease rods.

13. In a warp-uniting machine, the combination of means for uniting threads and severing the threads at one side of the knot, and a hook arranged to withdraw the waste ends produced by such severing, said hook having a stem which is guided for sliding and pivotal movement, and a rotatory crank arm to which said hook is pivoted.

14. A machine for operating upon warps having, in combination, a bed arranged to support a new warp, a carriage guided for movement longitudinally of the bed, a warp carriage supported above the bed and arranged to support an old warp, thread-selecting devices on the first carriage, new-warp lease rods supported at one end by the bed, and old-warp lease rods supported at one end by the warp carriage, the first carriage being arranged to slidably support all of said lease rods.

15. A warp-uniting machine having, in combination, means for supporting a new warp and an old warp in substantially parallel relation, selectors for selecting threads from the warps, a knotter located at one side of the selectors, two pivoted arms at each side of the knotter and at each side of the warps, a finger pivotally carried by each of said arms and arranged to engage a selected thread, means for swinging said arms, and means for modifying the movement imparted to said fingers by said arms to cause the fingers to move the threads to the knotter.

16. A warp-uniting machine having, in combination, a tight clamp and a loose clamp for supporting a new warp, two lease rods intermediate the clamps for holding the new-warp threads leased, a tight clamp and a loose clamp for supporting an old warp, two lease rods intermediate the last mentioned clamps for holding the old-warp threads leased, selectors oscillating on the axes of the lease rods for selecting threads from the warps, a knotter located at one side of the selectors, and devices located at opposite sides of the knotter for moving selected threads to the knotter.

17. A machine for operating upon warps having, in combination, a bed arranged to support stationarily a new warp, a carriage guided for movement longitudinally of the bed, a warp carriage supported above the bed and arranged to support an old warp, thread-selecting devices on the first carriage, new-warp lease rods secured at one end to the bed, and old-warp lease rods secured at one end to the warp carriage, the first carriage being arranged to slidably support all of said lease rods.

18. A warp-uniting machine having, in combination, a tight clamp and a loose clamp for supporting a new warp, two lease rods intermediate the clamps for holding the new-warp threads leased, a tight clamp and a loose clamp for supporting an old warp, two lease rods intermediate the last mentioned clamps for holding the old-warp threads leased, selectors oscillating on the axes of the lease rods for selecting threads from the warps, a knotter located at one side of the selectors, two new-warp fingers located at opposite sides of the knotter, two old-warp fingers located at opposite sides of the knotter, all of said fingers being located at one side of the selectors, and means for actuating said fingers to move selected threads to the knotter.

19. A warp-uniting machine having, in combination, a tight clamp and a loose clamp for supporting a new warp, two lease rods intermediate the clamps for holding the new-warp threads leased, a tight clamp and a loose clamp for supporting an old warp, two lease rods intermediate the last mentioned clamps for holding the old-warp threads leased, selectors oscillating on the axes of the lease rods for selecting threads from the warps, a knotter located between the selectors and the tight clamps, two new-warp fingers located at opposite sides of the knotter, two old-warp fingers located at opposite sides of the knotter, and means for actuating said fingers to move selected threads to the knotter.

20. A warp-uniting machine having, in combination, clamps and lease rods for supporting a leased new warp and a leased old warp in substantially parallel position, selectors oscillating on the axes of the lease rods for selecting threads from the warps, a knotter, two new-warp fingers located at opposite sides of the knotter, two old-warp fingers located at opposite sides of the knotter, and means for actuating said fingers to move selected threads to the knotter.

21. A warp-uniting machine having, in combination, clamps and lease rods for supporting a leased new warp and a leased old-warp in substantially parallel position, selectors oscillating on the axes of the lease rods for selecting threads from the warps, a knotter located at one side of the lease rods and comprising a tying bill located approximately in the planes of the warps, two new-warp fingers located at opposite sides of the knotter, two old-warp fingers located at opposite sides of the knotter, and means for actuating said fingers to move selected threads to the tying bill.

22. A warp-uniting machine having, in combination, clamps and lease rods for supporting a leased new warp and a leased old warp in substantially parallel relation, selectors oscillating on the axes of the lease rods for selecting threads from the warps, a knotter located at one side of the selectors, two pivoted arms at each side of the knotter and at each side of the warps, a finger pivotally carried by each of said arms and arranged to engage a selected thread, means for swinging said arms, and means for modifying the movement imparted to said fingers by said arms to cause the fingers to move the threads to the knotter.

23. A warp-uniting machine having, in combination, a tight clamp and a loose clamp for supporting a new warp, two lease rods intermediate the clamps for holding the new-warp threads leased, a tight clamp and a loose clamp for supporting an old warp, two lease rods intermediate the last mentioned clamps for holding the old-warp threads leased, selectors oscillating on the axes of the lease rods for selecting threads from the warps, a knotter located between the selectors and the tight clamps, and means for moving selected threads to the knotter, the slack required in the selected threads in forming the knot being pulled from the loose clamps.

24. A machine for operating upon warps having, in combination, two lease rods over which a warp is leased, the crossing point of the threads being between the rods, two selectors extending toward the crossing point of the threads, said selectors being connected for simultaneous oscillation in opposite directions, a cam and connections for actuating said selectors, a shaft for rotating the cam, and an adjustable connection between the cam and said shaft.

25. A machine for operating upon warps having, in combination, two lease rods over which a warp is leased, the crossing point of the threads being between the rods, a tubular stem fitting over each lease rod, a selector secured to each stem, the selectors extending toward the crossing point of the threads, a member connecting the tubular stems for simultaneous oscillation, a cam for actuating said member, a shaft for rotating the cam, and an adjustable connection between the cam and said shaft.

26. A machine for operating upon warps having, in combination, a selector, a cam and connections for actuating the selector, a shaft on which said cam is slidably and rotatably mounted, a part fixed to one of said members (namely, the cam and the shaft) said part having a plurality of apertures therein, a pin fixed to the other of said members and adapted to enter any one of the said apertures, and a spring bearing against the cam and normally holding the pin and the apertured part in engagement with each other.

27. A machine for operating upon warps having, in combination, a tight clamp and a loose clamp for supporting a warp, two lease rods intermediate the clamps for holding the warp threads leased, selectors oscillating on the axes of the lease rods for selecting threads from the warps, a knotter located between the selectors and the tight clamp, and devices located at opposite sides of the knotter for moving selected threads to the knotter, the slack required in the selected threads in forming the knot being pulled from the loose clamps.

28. A machine for operating upon warps having, in combination, a tight clamp and a loose clamp for supporting a warp, two lease rods intermediate the clamps for holding the warp threads leased, selectors for selecting threads from the warps, a knotter located between the selectors and the tight clamp, and devices located between the selectors and the tight clamp for moving selected threads to the knotter, the slack required in the selected threads in forming the knot being pulled from the loose clamps.

29. A warp-uniting machine having, in combination, clamps and lease rods for supporting a leased new warp and a leased old warp in substantially parallel position, selectors oscillating on the axes of the lease rods for selecting threads from the warps, a knotter located at one side of the lease rods and comprising a tying bill located approximately in the planes of the warps, and means for moving selected threads to the tying bill, the slack required in the selected threads in forming the knot being pulled from the loose clamps.

30. A warp-uniting machine having, in combination, clamps and lease rods for supporting a leased new warp and a leased old warp in substantially parallel relation, selectors for selecting threads from the warps, a knotter located at one side of the selectors and comprising a tying bill located approximately in the planes of the warps, and devices at opposite sides of the tying bill for moving selected threads to the tying bill.

In testimony whereof we affix our signatures in presence of two witnesses.

THOMAS ERNEST BINGHAM.
EARLE D. PARKER.

Witnesses to the signature of Thomas E. Bingham:
MALCOLM SMETHURST,
GEORGE WEAVER.

Witnesses to the signature of Earle D. Parker:
DAVIS S. SPRAGUE,
JOHN F. OLSON.